United States Patent
Krassowski et al.

(10) Patent No.: US 8,372,539 B2
(45) Date of Patent: Feb. 12, 2013

(54) UNIFORM GRAPHITE PLATE

(75) Inventors: Daniel W. Krassowski, Columbia Station, OH (US); Thomas W. Weber, Cleveland, OH (US); David J. Stuart, North Ridgeville, OH (US); Jeffery J. Gough, Olmsted Township, OH (US); Robert A. Mercuri, Seven Hills, OH (US); Jeremy H. Klug, Union, KY (US)

(73) Assignee: GrafTech International Holdings Inc., Parma, OH (US)

( * ) Notice: Subject to any disclaimer, the term of this patent is extended or adjusted under 35 U.S.C. 154(b) by 1172 days.

(21) Appl. No.: 11/861,355

(22) Filed: Sep. 26, 2007

(65) Prior Publication Data

US 2008/0131756 A1 Jun. 5, 2008

Related U.S. Application Data

(60) Provisional application No. 60/827,010, filed on Sep. 26, 2006.

(51) Int. Cl.
*H01M 4/13* (2010.01)

(52) U.S. Cl. ........ 429/210; 429/452; 429/512; 429/514; 428/34

(58) Field of Classification Search .................. 429/452, 429/545, 456–457, 463, 465, 468, 471, 512, 429/514, 517–521
See application file for complete search history.

(56) References Cited

U.S. PATENT DOCUMENTS

| | | | |
|---|---|---|---|
| 3,404,061 A | 10/1968 | Shane et al. | 161/125 |
| 4,895,713 A | 1/1990 | Greinke et al. | 423/448 |
| 7,182,898 B2 | 2/2007 | Klug | 264/145 |
| 2003/0022052 A1* | 1/2003 | Kearl | 429/34 |
| 2005/0164004 A1* | 7/2005 | Klug | 428/408 |

* cited by examiner

*Primary Examiner* — Raymond Alejandro
*Assistant Examiner* — Gary Harris

(57) ABSTRACT

A substrate useful for the formation of, inter alia, a flow field plate for a proton exchange membrane fuel cell, the substrate formed of at least one resin-impregnated sheet of compressed particles of exfoliated graphite comprising two major surfaces, the substrate having an active area with flow field channels thereon, the sheet of compressed particles of exfoliated graphite having a local web thickness in at least about 50% of its active area that is no more than about 55% greater than the minimum web thickness of the active area of the substrate.

10 Claims, 1 Drawing Sheet

UNIFORM GRAPHITE PLATE

RELATED APPLICATION

This application is a nonprovisional application which claims benefit of U.S. Provisional Patent Application Ser. No. 60/827,010, filed Sep. 26, 2006, entitled Uniform Graphite Flow Field Plate, the disclosure of which is incorporated herein by reference.

BACKGROUND OF THE INVENTION

1. Technical Field

The present invention related to a substrate plate which can be used in the formation of PEM fuel cell flow field plates; the inventive plate is formed of compressed particles of exfoliated graphite having a substantially uniform cross-sectional thickness, as described herein below. More particularly, the present invention relates to a graphite plate having a corrugated configuration and a substantially uniform cross-sectional thickness.

2. Background Art

An ion exchange membrane fuel cell, more specifically a proton exchange membrane (PEM) fuel cell, produces electricity through the chemical reaction of hydrogen and oxygen in the air. Within the fuel cell, electrodes denoted as anode and cathode surround a polymer electrolyte to form what is generally referred to as a membrane electrode assembly, or MEA. Oftentimes, the electrodes also function as the gas diffusion layer (or GDL) of the fuel cell. A catalyst material stimulates hydrogen molecules to split into hydrogen atoms and then, at the membrane, the atoms each split into a proton and an electron. The electrons are utilized as electrical energy. The protons migrate through the electrolyte and combine with oxygen and electrons to form water.

A PEM fuel cell includes a membrane electrode assembly sandwiched between two flow field plates. Conventionally, the membrane electrode assembly consists of random-oriented carbon fiber paper electrodes (anode and cathode) with a thin layer of a catalyst material, particularly platinum or a platinum group metal coated on isotropic carbon particles, such as lamp black, bonded to either side of a proton exchange membrane disposed between the electrodes. In operation, hydrogen flows through channels formed along the surface of one of the flow field plates to the anode, where the catalyst promotes its separation into hydrogen atoms and thereafter into protons that pass through the membrane and electrons that flow through an external load. Air flows through the channels along the surface of the other flow field plate to the cathode, where the oxygen in the air is separated into oxygen atoms, which joins with the protons through the proton exchange membrane and the electrons through the circuit, and combine to form water. Since the membrane is an insulator, the electrons travel through an external circuit in which the electricity is utilized, and join with protons at the cathode. An air stream on the cathode side is one mechanism by which the water formed by combination of the hydrogen and oxygen is removed. Combinations of such fuel cells are used in a fuel cell stack to provide the desired voltage.

As noted in, inter alia, U.S. Pat. No. 7,182,898, the use of resin-impregnated sheets of compressed particles of exfoliated graphite for forming the flow field plates for PEM fuel cells has many distinct advantages. One disadvantage of the use of such materials lies in the plastic nature of the resin/graphite composite until resin cure is effected. During embossing to create the flow field groove or channel needed to direct fluid flow along the surface of the sheet, resin flow through the graphite sheets can result in areas of differing cross-sectional thickness, which can lead to fractures, cracks, or other leak-paths. The present invention can overcome these disadvantages.

Graphites are made up of layer planes of hexagonal arrays or networks of carbon atoms. These layer planes of hexagonally arranged carbon atoms are substantially flat and are oriented or ordered so as to be substantially parallel and equidistant to one another. The substantially flat, parallel equidistant sheets or layers of carbon atoms, usually referred to as graphene layers or basal planes, are linked or bonded together and groups thereof are arranged in crystallites. Highly ordered graphites consist of crystallites of considerable size, the crystallites being highly aligned or oriented with respect to each other and having well ordered carbon layers. In other words, highly ordered graphites have a high degree of preferred crystallite orientation. It should be noted that graphites possess anisotropic structures and thus exhibit or possess many properties that are highly directional such as thermal and electrical conductivity.

Briefly, graphites may be characterized as laminated structures of carbon, that is, structures consisting of superposed layers or laminae of carbon atoms joined together by weak Van der Waals forces. In considering the graphite structure, two axes or directions are usually noted, to wit, the "c" axis or direction and the "a" axes or directions. For simplicity, the "c" axis or direction may be considered as the direction perpendicular to the carbon layers. The "a" axes or directions may be considered as the directions parallel to the carbon layers or the directions perpendicular to the "c" direction. The graphites suitable for manufacturing flexible graphite sheets possess a very high degree of orientation.

As noted above, the bonding forces holding the parallel layers of carbon atoms together are only weak Van der Waals forces. Natural graphites can be treated so that the spacing between the superposed carbon layers or laminae can be appreciably opened up so as to provide a marked expansion in the direction perpendicular to the layers, that is, in the "c" direction, and thus form an expanded or intumesced graphite structure in which the laminar character of the carbon layers is substantially retained.

Graphite flake which has been greatly expanded and more particularly expanded so as to have a final thickness or "c" direction dimension which is as much as about 80 or more times the original "c" direction dimension can be formed without the use of a binder into cohesive or integrated sheets of expanded graphite, e.g. webs, papers, strips, tapes, foils, mats or the like (typically referred to as "flexible graphite"). The formation of graphite particles which have been expanded to have a final thickness or "c" dimension which is as much as about 80 times or more the original "c" direction dimension into integrated flexible sheets by compression, without the use of any binding material, is believed to be possible due to the mechanical interlocking, or cohesion, which is achieved between the voluminously expanded graphite particles.

In addition to flexibility, the sheet material, as noted above, has also been found to possess a high degree of anisotropy with respect to thermal conductivity due to orientation of the expanded graphite particles and graphite layers substantially parallel to the opposed faces of the sheet resulting from high compression, making it especially useful in heat spreading applications. Sheet material thus produced has excellent flexibility, good strength and a high degree of orientation.

Briefly, the process of producing flexible, binderless anisotropic graphite sheet material, e.g. web, paper, strip, tape, foil, mat, or the like, comprises compressing or compacting under a predetermined load and in the absence of a binder, expanded graphite particles which have a "c" direction dimension which is as much as about 80 or more times that of the original particles so as to form a substantially flat, flexible, integrated graphite sheet. The expanded graphite particles that generally are worm-like or vermiform in appearance, once compressed, will maintain the compression set and alignment with the opposed major surfaces of the sheet. The density and thickness of the sheet material can be varied by controlling the degree of compression. The density of the sheet material can be within the range of from about 0.04 g/cc to about 2.0 g/cc.

The flexible graphite sheet material exhibits an appreciable degree of anisotropy due to the alignment of graphite particles parallel to the major opposed, parallel surfaces of the sheet, with the degree of anisotropy increasing upon compression of the sheet material to increase orientation. In compressed anisotropic sheet material, the thickness, i.e. the direction perpendicular to the opposed, parallel sheet surfaces comprises the "c" direction and the directions ranging along the length and width, i.e. along or parallel to the opposed, major surfaces comprises the "a" directions and the thermal and electrical properties of the sheet are very different, by orders of magnitude, for the "c" and "a" directions.

Accordingly, what is desired is a substrate for the formation of components of electrochemical fuel cells, especially flow field plates or the like, where the substrate is formed of one or more resin-impregnated sheets of compressed particles of exfoliated graphite, and which has a substantially uniform cross-sectional thickness and is dimensionally stable.

SUMMARY OF THE INVENTION

Accordingly, it is an object of the present invention to provide a plate useful in the formation of a flow field plate for a PEM fuel cell, having an active area, where the voltage drop in the active area is within an acceptable range.

It is another object of the present invention to provide a substrate for a flow field plate for a PEM fuel cell, having an active area, where the active area has a substantially uniform cross-section.

It is a further object of the present invention to provide an article comprising of at least one resin-impregnated sheet of compressed particles of exfoliated graphite having a substantially uniform cross-sectional thickness within a specific area of the article.

It is still another object of the present invention to provide an article which can be used in the formation of a flow field plate for a PEM fuel cell formed of at least one resin-impregnated sheet of compressed particles of exfoliated graphite, where the flow field plate has an active area having a substantially uniform cross-sectional thickness.

It is yet another object of the present invention to provide a component for a PEM fuel cell formed of at least one resin-impregnated sheet of compressed particles of exfoliated graphite having a substantially uniform cross-sectional thickness within a substantial portion of an active area thereof, the active area advantageously assuming a corrugated configuration.

These objects and others which will be apparent to the skilled artisan upon reading the following description, can be achieved by providing a substrate which can be used in the formation of, inter alia, a flow field plate for a proton exchange membrane fuel cell, the substrate formed of at least one resin-impregnated sheet of compressed particles of exfoliated graphite comprising two major surfaces, and having an active area with flow field channels thereon, the sheet of compressed particles of exfoliated graphite having a local web thickness in at least about 50% of its active area that is no more than about 55% greater than the minimum web thickness of the active area of the plate.

Advantageously, the active area of the inventive substrate is provided with corrugations which form ridges and furrows on one or both of the major surfaces thereof, further wherein the furrows form the flow field channels. The ridge to ridge distance of the corrugations measured from the center of one ridge to the center of an adjoining ridge is preferably from about 0.75 mm to about 4.0 mm, more preferably from about from about 0.8 mm to about 2.8 mm. The depth of the flow field channels is from about 0.1 mm to about 4.0 mm, more preferably from about 0.2 mm to about 2.0 mm. The depth of the channels for a corrugated part is a function of the thickness of the corrugated plate, rather than the thickness of the sheet from which it is formed.

It is to be understood that both the foregoing general description and the following detailed description present embodiments of the invention, and are intended to provide an overview or framework for understanding the nature and character of the invention as it is claimed. The accompanying drawings are included to provide a further understanding of the invention, and are incorporated in and constitute a part of this specification. The drawings illustrate various embodiments of the invention, and together with the description serve to explain the principles and operations of the invention.

DETAILED DESCRIPTION OF THE PREFERRED EMBODIMENT

Figure 1:
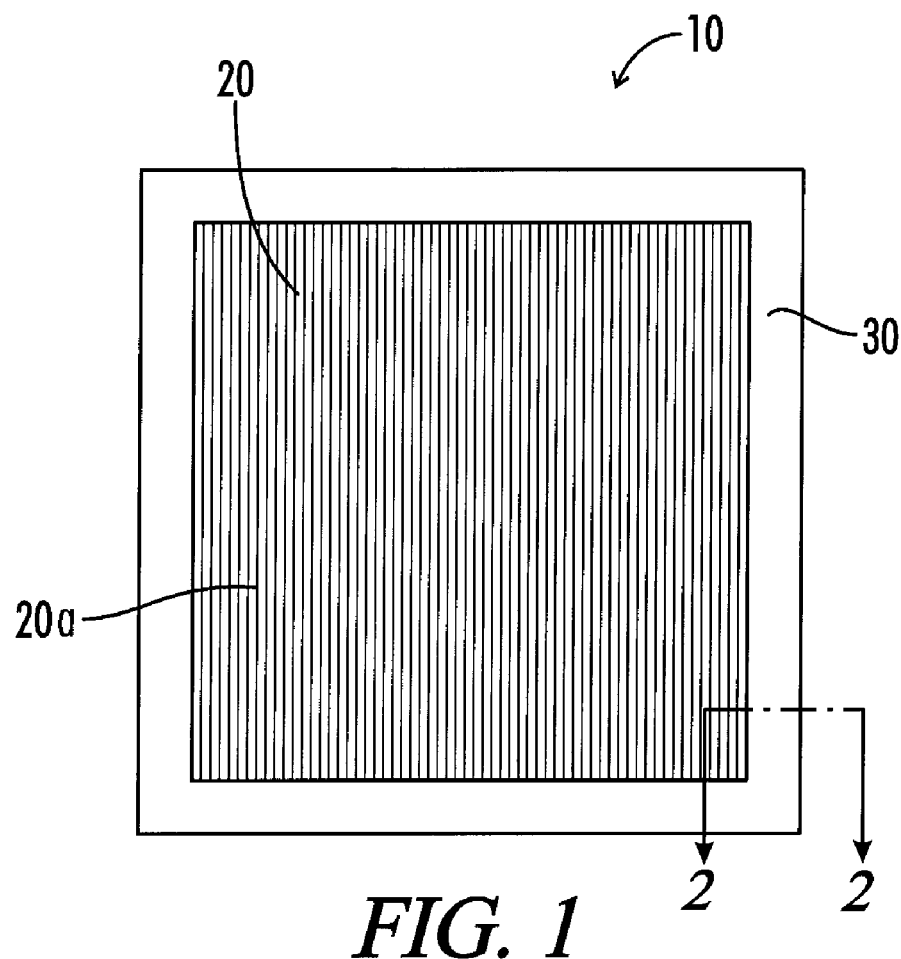
FIG. 1 is a top plan view of a substrate useful for the formation of a flow field plate for a PEM fuel cell in accordance with the present invention, showing the active area and the border therearound.

As noted, the inventive substrate is advantageously formed of at least one resin-impregnated sheet of compressed particles of exfoliated graphite. Graphite is a crystalline form of carbon comprising atoms covalently bonded in flat layered planes with weaker bonds between the planes. By treating particles of graphite, such as natural graphite flake, with an intercalant of, e.g. a solution of sulfuric and nitric acid, the crystal structure of the graphite reacts to form a compound of graphite and the intercalant. The treated particles of graphite are hereafter referred to as "particles of intercalated graphite." Upon exposure to high temperature, the intercalant within the graphite decomposes and volatilizes, causing the particles of intercalated graphite to expand in dimension as much as about 80 or more times its original volume in an accordion-like fashion in the "c" direction, i.e. in the direction perpendicular to the crystalline planes of the graphite. The exfoliated graphite particles are vermiform in appearance, and are therefore commonly referred to as worms. The worms may be compressed together into flexible sheets that, unlike the original graphite flakes, can be formed and cut into various shapes.

Graphite starting materials suitable for use in the present invention include highly graphitic carbonaceous materials capable of intercalating organic and inorganic acids as well as halogens and then expanding when exposed to heat. These highly graphitic carbonaceous materials most preferably have a degree of graphitization of about 1.0. As used in this disclosure, the term "degree of graphitization" refers to the value g according to the formula:

$$g = \frac{3.45 - d(002)}{0.095}$$

where d(002) is the spacing between the graphitic layers of the carbons in the crystal structure measured in Angstrom units. The spacing d between graphite layers is measured by standard X-ray diffraction techniques. The positions of diffraction peaks corresponding to the (002), (004) and (006) Miller Indices are measured, and standard least-squares techniques are employed to derive spacing which minimizes the total error for all of these peaks. Examples of highly graphitic carbonaceous materials include natural graphites from various sources, as well as other carbonaceous materials such as graphite prepared by chemical vapor deposition, high temperature pyrolysis of polymers, or crystallization from molten metal solutions and the like. Natural graphite is most preferred.

The graphite starting materials used in the present invention may contain non-graphite components so long as the crystal structure of the starting materials maintains the required degree of graphitization and they are capable of exfoliation. Generally, any carbon-containing material, the crystal structure of which possesses the required degree of graphitization and which can be exfoliated, is suitable for use with the present invention. Such graphite preferably has a purity of at least about eighty weight percent. More preferably, the graphite employed for the present invention will have a purity of at least about 94%. In the most preferred embodiment, the graphite employed will have a purity of at least about 98%.

A common method for manufacturing graphite sheet is described by Shane et al. in U.S. Pat. No. 3,404,061, the disclosure of which is incorporated herein by reference. In the typical practice of the Shane et al. method, natural graphite flakes are intercalated by dispersing the flakes in a solution containing e.g., a mixture of nitric and sulfuric acid, advantageously at a level of about 20 to about 300 parts by weight of intercalant solution per 100 parts by weight of graphite flakes (pph). The intercalation solution contains oxidizing and other intercalating agents known in the art. Examples include those containing oxidizing agents and oxidizing mixtures, such as solutions containing nitric acid, potassium chlorate, chromic acid, potassium permanganate, potassium chromate, potassium dichromate, perchloric acid, and the like, or mixtures, such as for example, concentrated nitric acid and chlorate, chromic acid and phosphoric acid, sulfuric acid and nitric acid, or mixtures of a strong organic acid, e.g. trifluoroacetic acid, and a strong oxidizing agent soluble in the organic acid. Alternatively, an electric potential can be used to bring about oxidation of the graphite. Chemical species that can be introduced into the graphite crystal using electrolytic oxidation include sulfuric acid as well as other acids.

In a preferred embodiment, the intercalating agent is a solution of a mixture of sulfuric acid, or sulfuric acid and phosphoric acid, and an oxidizing agent, i.e. nitric acid, perchloric acid, chromic acid, potassium permanganate, hydrogen peroxide, iodic or periodic acids, or the like. Although less preferred, the intercalation solution may contain metal halides such as ferric chloride, and ferric chloride mixed with sulfuric acid, or a halide, such as bromine as a solution of bromine and sulfuric acid or bromine in an organic solvent.

The quantity of intercalation solution may range from about 20 to about 350 pph and more typically about 40 to about 160 pph. After the flakes are intercalated, any excess solution is drained from the flakes and the flakes are water-washed. Alternatively, the quantity of the intercalation solution may be limited to between about 10 and about 40 pph, which permits the washing step to be eliminated as taught and described in U.S. Pat. No. 4,895,713, the disclosure of which is also herein incorporated by reference.

The particles of graphite flake treated with intercalation solution can optionally be contacted, e.g. by blending, with a reducing organic agent selected from alcohols, sugars, aldehydes and esters which are reactive with the surface film of oxidizing intercalating solution at temperatures in the range of 25° C. and 125° C. Suitable specific organic agents include hexadecanol, octadecanol, 1-octanol, 2-octanol, decylalcohol, 1,10 decanediol, decylaldehyde, 1-propanol, 1,3 propanediol, ethyleneglycol, polypropylene glycol, dextrose, fructose, lactose, sucrose, potato starch, ethylene glycol monostearate, diethylene glycol dibenzoate, propylene glycol monostearate, glycerol monostearate, dimethyl oxylate, diethyl oxylate, methyl formate, ethyl formate, ascorbic acid and lignin-derived compounds, such as sodium lignosulfate. The amount of organic reducing agent is suitably from about 0.5 to 4% by weight of the particles of graphite flake.

The use of an expansion aid applied prior to, during or immediately after intercalation can also provide improvements. Among these improvements can be reduced exfoliation temperature and increased expanded volume (also referred to as "worm volume"). An expansion aid in this context will advantageously be an organic material sufficiently soluble in the intercalation solution to achieve an improvement in expansion. More narrowly, organic materials of this type that contain carbon, hydrogen and oxygen, preferably exclusively, may be employed. Carboxylic acids have been found especially effective. A suitable carboxylic acid useful as the expansion aid can be selected from aromatic, aliphatic or cycloaliphatic, straight chain or branched chain, saturated and unsaturated monocarboxylic acids, dicarboxylic acids and polycarboxylic acids which have at least 1 carbon atom, and preferably up to about 15 carbon atoms, which is soluble in the intercalation solution in amounts effective to provide a measurable improvement of one or more aspects of exfoliation. Suitable organic solvents can be employed to improve solubility of an organic expansion aid in the intercalation solution.

Representative examples of saturated aliphatic carboxylic acids are acids such as those of the formula $H(CH_2)_n COOH$ wherein n is a number of from 0 to about 5, including formic, acetic, propionic, butyric, pentanoic, hexanoic, and the like. In place of the carboxylic acids, the anhydrides or reactive carboxylic acid derivatives such as alkyl esters can also be employed. Representative of alkyl esters are methyl formate and ethyl formate. Sulfuric acid, nitric acid and other known aqueous intercalants have the ability to decompose formic acid, ultimately to water and carbon dioxide. Because of this, formic acid and other sensitive expansion aids are advantageously contacted with the graphite flake prior to immersion of the flake in aqueous intercalant. Representative of dicarboxylic acids are aliphatic dicarboxylic acids having 2-12 carbon atoms, in particular oxalic acid, fumaric acid, malonic acid, maleic acid, succinic acid, glutaric acid, adipic acid, 1,5-pentanedicarboxylic acid, 1,6-hexanedicarboxylic acid, 1,10-decanedicarboxylic acid, cyclohexane-1,4-dicarboxylic acid and aromatic dicarboxylic acids such as phthalic acid or terephthalic acid. Representative of alkyl esters are dimethyl oxylate and diethyl oxylate. Representative of cycloaliphatic acids is cyclohexane carboxylic acid and of aromatic carboxylic acids are benzoic acid, naphthoic acid, anthranilic acid, p-aminobenzoic acid, salicylic acid, o-, m- and p-tolyl acids, methoxy and ethoxybenzoic acids, acetoacetamidobenzoic acids and, acetamidobenzoic acids, phenylacetic acid and naphthoic acids. Representative of hydroxy aromatic acids are hydroxybenzoic acid, 3-hydroxy-1-naphthoic acid, 3-hydroxy-2-naphthoic acid, 4-hydroxy-2-naphthoic acid, 5-hydroxy-1-naphthoic acid, 5-hydroxy-2-naphthoic acid, 6-hydroxy-2-naphthoic acid and 7-hydroxy-2-naphthoic acid. Prominent among the polycarboxylic acids is citric acid.

The intercalation solution will be aqueous and will preferably contain an amount of expansion aid of from about 1 to 10%, the amount being effective to enhance exfoliation. In the embodiment wherein the expansion aid is contacted with the graphite flake prior to or after immersing in the aqueous intercalation solution, the expansion aid can be admixed with the graphite by suitable means, such as a V-blender, typically in an amount of from about 0.2% to about 10% by weight of the graphite flake.

After intercalating the graphite flake, and following the blending of the intercalant coated intercalated graphite flake with the organic reducing agent, the blend is exposed to temperatures in the range of 25° to 125° C. to promote reaction of the reducing agent and intercalant coating. The heating period is up to about 20 hours, with shorter heating periods, e.g., at least about 10 minutes, for higher temperatures in the above-noted range. Times of one half hour or less, e.g., on the order of 10 to 25 minutes, can be employed at the higher temperatures.

The thusly treated particles of graphite are sometimes referred to as "particles of intercalated graphite." Upon exposure to high temperature, e.g. temperatures of at least about 160° C. and especially about 700° C. to 1000° C. and higher, the particles of intercalated graphite expand as much as about 80 to 1000 or more times their original volume in an accordion-like fashion in the c-direction, i.e. in the direction perpendicular to the crystalline planes of the constituent graphite particles. The expanded, i.e. exfoliated, graphite particles are vermiform in appearance, and are therefore commonly referred to as worms. The worms may be compressed together into flexible sheets that, unlike the original graphite flakes, can be formed or embossed with structures, including flow field grooves or channels along one or both of the surfaces thereof.

Graphite sheet and foil are coherent, with good handling strength, and are suitably compressed, e.g. by roll pressing, to a thickness of about 0.075 mm to 3.75 mm and a typical density of about 0.1 to 1.5 grams per cubic centimeter (g/cc) or higher.

Sheets of compressed particles of exfoliated graphite can be treated with resin and the absorbed resin, after curing, enhances the moisture resistance and handling strength, i.e. stiffness, of the flexible graphite article as well as "fixing" the morphology of the article. Suitable resin content is preferably at least about 5% by weight, more preferably about 10 to 35% by weight, and suitably up to about 60% by weight. Resins found especially useful in the practice of the present invention include acrylic-, epoxy- and phenolic-based resin systems, fluoro-based polymers, or mixtures thereof. Suitable epoxy resin systems include those based on diglycidyl ether of bisphenol A (DGEBA) and other multifunctional resin systems; phenolic resins that can be employed include resole and novolac phenolics. Optionally, the flexible graphite may be impregnated with fibers and/or salts in addition to the resin or in place of the resin. Additionally, reactive or non-reactive additives may be employed with the resin system to modify properties (such as tack, material flow, hydrophobicity, etc.).

Figure 2:
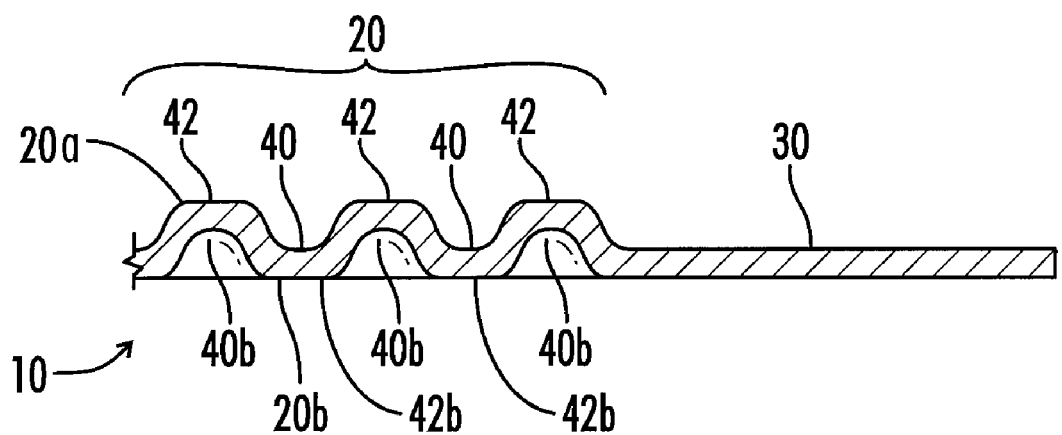
FIG. 2 is partial side plan cross-sectional view of the substrate plate of FIG. 1, taken along lines 2-2.

Referring now to FIGS. 1 and 2, the present invention relates to an article or substrate for the formation of a flow field plate, denoted 10, for use in a PEM fuel cell. Plate 10 generally has an active area 20 and a border area 30 at least partially surrounding active area 20. As used herein, and in the fuel cell industry generally, the active area of a flow field plate is that area of the plate which serves to contact and transport a fluid, more particularly, hydrogen or air. Active area 20 of plate 10 includes a series of grooves (sometimes referred to as channels) 40 formed along the surface of one or both sides of plate 10. Contrariwise, border area 30 is generally substantially flat and can incorporate one or more structures like manifold ports, etc. (not shown), to facilitate flow of reactant into and along grooves 40.

Advantageously, plate 10 is formed of at least one resin-impregnated sheet of compressed particles of exfoliated graphite; alternatively, plate 10 can be formed of a laminate of resin-impregnated sheets of compressed particles of exfoliated graphite. Plate 10 has two major surfaces, which can be denoted "top" and "bottom" for convenience. Such sheets can be embossed or otherwise formed (preferably before resin cure or, under certain circumstances, after at least partial cure of the resin) into complex shapes as described herein, to form flow field channels or grooves, cooling channels or grooves, and the like.

In one preferred embodiment of the invention, active area 20 of plate 10 assume a corrugated cross-sectional configuration. By "corrugated" is meant that at least a portion of active area 20 is formed into alternating furrows (or grooves) and ridges, as shown in FIG. 2, where the ridges 42 comprise the raised portions on the top surface (20a) of active area 20 and the furrows comprise grooves 40 of active area 20, when viewed in the orientation of FIG. 2 (although it will be recognized by the skilled artisan that plate 10, or a fuel cell in which plate 10 is utilized, can be used in a variety of orientations). Generally, the bottom surface (20b) of active area 20 assumes the "mirror image" configuration as found on top surface 20a. That is, ridges 42 on top surface 20a form the furrows or grooves 40b on bottom surface 20b, and grooves 40 found on top surface 20a comprise the ridges 42b on bottom surface 20b. The dimensions and separation of ridges and furrows can depend on many factors, and are primarily based on the engineering of the fuel cell plate 10 is destined to be used in. Preferably, however, the ridge to ridge distance (measured from the center of one ridge 42 to the center of an adjoining ridge 42) is from about 0.75 mm to about 4.0 mm, more preferably from about 0.8 mm to about 2.8 mm. Also, while varying greatly depending on the nature and engineering of the fuel cell in which plate 10 is to be used, the depth of grooves 40 should preferably vary from about 0.1 mm to about 4.0 mm, more preferably from about 0.2 mm to about 2.0 mm.

In accordance with the present invention, the thickness of the graphite sheet (referred to as "web thickness") within a major portion of active area 20 is substantially uniform. By this is meant that at least 50% of the graphite sheet within active area 20 (in terms of surface area) has a local web thickness that is no more than about 55% greater than the minimum web thickness in that portion of active area 20 of the graphite sheet which forms plate 10. Advantageously, at least 50% of the graphite sheet within active area 20 has a local web thickness that is no more than about 40% greater than the minimum web thickness in that portion of active area 20. Indeed, preferably, the entire active area 20 of flow field plate 10 has a thickness that is no more than about 55% greater than the minimum web thickness of active area 20 of plate 10. Most preferably, the thickness of the entire active area 20 is no greater than about 40% greater than the minimum web thickness of active area 20. The local web thickness is defined as the distance from one (or first) major surface of the sheet to the opposing (or second) major surface of the sheet, measured perpendicular (i.e., normal) to the first major surface, at any given location in active area 20. The minimum web thickness of the graphite sheet is defined as the minimum distance measurement from one major surface of the sheet to the opposing major surface of the sheet, measured at the angle which minimizes this distance. The density of plate 10 within the portion of active area 20 where substantially uniform thickness is found should advantageously be at least about 1.5 g/cc, more preferably at least about 1.6 g/cc.

Thus, by the practice of the present invention, a substrate which can be used to form a flow field plate for a PEM fuel cell can be provided where the web thickness, that is, the thickness of the plate, in a major portion of its active area is substantially uniform. The plate can be formed of at least one resin-impregnated sheet of compressed particles of exfoliated graphite, formed into a corrugated pattern to provide flow field grooves on at least one major surface of the sheet.

All cited patents and publications referred to in this application are incorporated by reference.

The invention thus being described, it will obvious that it may be varied in many ways. Such variations are not to be regarded as a departure from the spirit and scope of the present invention and all such modifications as would be obvious to one skilled in the art are intended to be included in the scope of the following claims.

What is claimed is:

1. A substrate for the formation of a flow field plate for a proton exchange membrane fuel cell, the substrate comprising at least one resin-impregnated sheet of compressed particles of exfoliated graphite comprising two major surfaces, wherein the substrate is assembled in the proton exchange membrane fuel cell, the substrate having an active area with flow field channels thereon, wherein the flow field channels have a depth of from about 0.2 mm to about 2.0 mm, wherein the active area is provided with mirror image corrugations on each of the major surfaces, which form ridges and furrows, the sheet of compressed particles of exfoliated graphite having a local web thickness in the active area which is no more than about 40% greater than the minimum web thickness of the active area, wherein the at least one resin-impregnated sheet of compressed particles of exfoliated graphite has a density of at least about 1.5 g/cc.

2. The substrate of claim 1, wherein the furrows on one of the major surfaces of the substrate comprise flow field channels.

3. The substrate of claim 2, wherein the ridge to ridge distance of the corrugations measured from the center of one ridge to the center of an adjoining ridge is from about 0.75 mm to about 4.0 mm.

4. The substrate of claim 3, wherein the ridge to ridge distance is from about 0.8 mm to about 2.8 mm.

5. The substrate of claim 2, wherein the flow field channels have a depth of from about 0.1 mm to about 4.0 mm.

6. A substrate for the formation of a flow field plate for a proton exchange membrane fuel cell, the substrate comprising at least one resin-impregnated sheet of compressed particles of exfoliated graphite comprising two major surfaces, the substrate having a mirror image corrugated cross-sectional configuration on each of the major surfaces, wherein the substrate is assembled in the proton exchange membrane fuel cell, the corrugated cross-section comprising alternating ridges and grooves, wherein the substrate has an active area where the grooves comprise flow field channels, wherein the flow field channels have a depth of from about 0.2 mm to about 2.0 mm, wherein at least 50% of the graphite sheet within the active area, based on surface area, has a local web thickness which is no more than about 40% greater than the minimum web thickness of the active area, wherein the at least one resin-impregnated sheet of compressed particles of exfoliated graphite has a density of at least about 1.5 g/cc.

7. The substrate of claim 6, wherein the ridge to ridge distance of the corrugations measured from the center of one ridge to the center of an adjoining ridge is from about 0.75 mm to about 4.0 mm.

8. The substrate of claim 7, wherein the ridge to ridge distance is from about 0.8 mm to about 2.8 mm.

9. The substrate of claim 6, wherein the flow field channels have a depth of from about 0.1 mm to about 4.0 mm.

10. The substrate of claim 6, wherein the thickness of the entire active area is no greater than about 40% greater than the minimum web thickness of the active area.

* * * * *